US005501609A

United States Patent [19]

Watanabe

[11] Patent Number: 5,501,609

[45] Date of Patent: Mar. 26, 1996

[54] CONNECTOR HAVING A SOFT CUSHION MEMBER

[75] Inventor: Kaoru Watanabe, Yokkaichi, Japan

[73] Assignee: Sumitomo Wiring Systems, Ltd., Japan

[21] Appl. No.: 342,339

[22] Filed: Nov. 18, 1994

[30] Foreign Application Priority Data

Nov. 26, 1993 [JP] Japan .............................. 5-068072 U

[51] Int. Cl.$^{6}$ .............................................. A01R 13/52

[52] U.S. Cl. ......................... 439/277; 439/556; 439/273

[58] Field of Search .................................. 439/271, 272, 439/277, 556, 559

[56] References Cited

U.S. PATENT DOCUMENTS

| | | | |
|---|---|---|---|
| 3,617,986 | 11/1971 | Becker et al. | 439/277 |
| 3,976,352 | 8/1976 | Spinner | 439/272 |
| 4,669,793 | 6/1987 | Hayadri et al. | 439/559 |
| 4,684,190 | 8/1987 | Clark et al. | 439/277 |
| 5,100,336 | 3/1992 | Burgess et al. | 439/277 |
| 5,277,610 | 1/1994 | Krehbiel et al. | 439/271 |

FOREIGN PATENT DOCUMENTS

| | | | |
|---|---|---|---|
| 55263 | 12/1991 | Japan | H01R 13/52 |

*Primary Examiner*—David L. Pirlot
*Assistant Examiner*—Jill Demello
*Attorney, Agent, or Firm*—Jordan B. Bierman; Bierman and Muserlian

[57] ABSTRACT

This invention aims to provide a connector in which a stationary connector housing is provided on its flange with a cushion member to be closely attached to a panel to give a stable seal function regardless of a change of thickness of the panel. A male connector housing 13 of the connector is provided on an upper periphery on a hood 13b with a flange 13d. The male connector housing 13 is provided with securing fixtures 19 made of a leaf spring material. The housing 13 is secured to a periphery around an opening 12a in a panel 12 by clamping it between an upper elastic piece 19a and a flange 13d. The flange 13d is provided on its upper face with a cushion member 20 which is softer than a seal member 16 of a waterproofing cover 17. When a female connector housing 14 is fitted to the male connector housing 13, the seal member 16 closely contacts with a surface of the panel. A compressive deformation of the cushion member 20 makes a distance between the upper face of the flange 13d and a lower end of the seal member 16 a given value.

3 Claims, 5 Drawing Sheets

CONNECTOR HAVING A SOFT CUSHION MEMBER

BACKGROUND OF THE INVENTION (1) Field of the Invention

This invention relates to a connector including a stationary connector housing to be attached to an opening in a panel and a detachable connector housing which is provided with a waterproofing seal member and is adapted to be fitted to the stationary connector housing.

(2) Statement of the Prior Art

For convenience of explanation, a conventional connector provided with a waterproofing construction will be described below by referring to FIGS. 4 and 5.

FIG. 4 is a longitudinal sectional view of a conventional connector, illustrating a state of the connector attached to a panel having a relatively small thickness. FIG. 5 is a longitudinal sectional view of a conventional connector, illustrating a state of the connector attached to a panel having a relatively large thickness.

In the conventional connector shown in FIG. 4, the male connector housing 1 has a flange la on an upper end periphery of a hood **1*b* which is opened at an upper face. The flange 1*a* is attached to the rear periphery around an opening 2*a* in a panel 2 to secure the housing 1 to the panel 2. On the other hand, a female connector housing 3 is covered with a waterproofing cover 4 at its upper face and is provided around an upper periphery with a waterproofing rubber seal member 5**.

In this case, the female connector housing 3 is coupled to the male connector housing 1 through the panel 2 by fastening a bolt 6 on a center front side of the panel 2 into a nut 7 on a center rear side of the panel 2. At this time, terminals (not shown) in the both connector housings 1 and 3 are interconnected and the seal member 5 closely contacts with a front periphery around the opening **2*a* in the panel 2 with the member 5** being compressed by a given amount, thereby preventing water on the outside from entering the housings.

However, the panel 2 on which the connector is mounted has various thicknesses. For example, there are not only a panel 2 shown in FIG. 4 which is relatively thin but also a panel 2 shown in FIG. 5 which is relatively thick. However, if the thickness of the panel 2 is changed, a distance between the flange la of the male connector housing 1 and the surface of the panel 2, that is, a lower end of the seal member 5 is changed in accordance with the thickness in the above conventional construction.

If a connector in which a dimension and a shape of the seal member 5 are set to be suitable for, e.g. a thin panel 2 shown in FIG. 4 is attached to a thick panel 2 shown in FIG. 5, a compression amount of the seal member 5 becomes great to cause a creep in the member. Also, it is impossible to couple the female connector housing 3 to the male connector housing 1 sufficiently and to obtain an effective contact area between the terminals. On the other hand, if a connector in which the dimension and shape of the seal member 5 are set to be suitable for a thick panel 2 is attached to a thin panel 2, it will be difficult to obtain a close contact of the seal member 5. This results in a poor waterproofing effect.

SUMMARY OF THE INVENTION

An object of the present invention is to provide a connector in which a stationary connector housing is provided on its flange with a cushion member to be closely attached to a panel to provide a stable seal function regardless of a change of thickness of the panel.

In order to achieve the above object, a connector of the present invention comprises: a stationary connector housing adapted to be secured to a rear side of a panel having an opening so that a connecting end portion of the housing is opposed to the opening; a detachable connector housing adapted to be removably attached to a front side of the panel and fitted through the opening in the panel to the stationary connector housing; a waterproofing seal member provided on the detachable connector housing for closely contacting with a front side periphery around the opening in said panel upon fitting of the connector housings; a flange provided on the stationary connector housing and adapted to be opposed to a rear side periphery around the opening in the panel; and a cushion member disposed between the flange and the rear side periphery around the opening in the panel.

Preferably, the cushion member is made of a material which is softer than the seal member. Further, the stationary connector housing has securing fixtures made of a leaf spring material. The panel is clamped between the securing fixtures and the flange to secure the stationary connector housing to the panel.

According to the connector of the present invention, the stationary connector housing is mounted on the panel with the flange being disposed on the rear periphery around the opening in the panel. Since the flange is mounted on the panel through the cushion member, a position of the flange relative to the rear side of the panel can be adjusted by a thickness of the cushion member. Accordingly, even if the thickness of the panel is altered, it is possible to set the attaching position of the stationary connector housing as well as the flange relative to the front side of the panel to be always constant.

Also, if the cushion member is made of a material being softer than the seal member, it is possible to automatically adjust a position of the stationary connector housing relative to the panel by means of a compressive deformation of the cushion member caused by a coupling force exerted when the detachable connector housing is fitted to the stationary connector housing. Accordingly, even if an adjustment of position of the stationary connector housing is not carried out predeterminedly in accordance with the thickness of the panel, it is possible to set the attaching position of the stationary connector housing as well as the flange relative to the front side of the panel to be always constant regardless of the thickness of the panel.

Further, in this case, if the stationary connector housing is secured to the rear side of the panel by the securing fixtures made of the leaf spring material so that the panel is clamped between the flange and the securing fixtures, it is possible to easily attach the stationary connector housing to the panel.

According to the connector of the present invention, since the cushion member is disposed between the flange of the stationary connector housing and the rear periphery around the opening in the panel, the attaching position of the stationary connector housing relative to the front side of the panel can be set to be always constant even if the thickness of the panel is altered. In other words, it is possible to dispose the front side of the panel at a given position relative to the stationary connector housing. Consequently, it is possible to maintain constant the amount of compression of the waterproofing seal member on the detachable connector housing, thereby obtaining a stable sealing function.

Also, if the cushion member is made of a softer material than the seal member, an adjustment of position of the stationary connector housing can be carried out naturally by the coupling force exerted upon interconnecting of both connector housings and thus an adjusting work in compliance with the thickness of the panel becomes unnecessary.

Further, since the stationary connector housing is attached to the panel by the securing fixture made of the lead spring material so that the panel is clamped between the flange of the housing and the fixture attachment of the stationary connector housing onto the panel can be easily carried out.

DETAILED DESCRIPTION OF THE PREFERRED EMBODIMENTS

Figure 1:
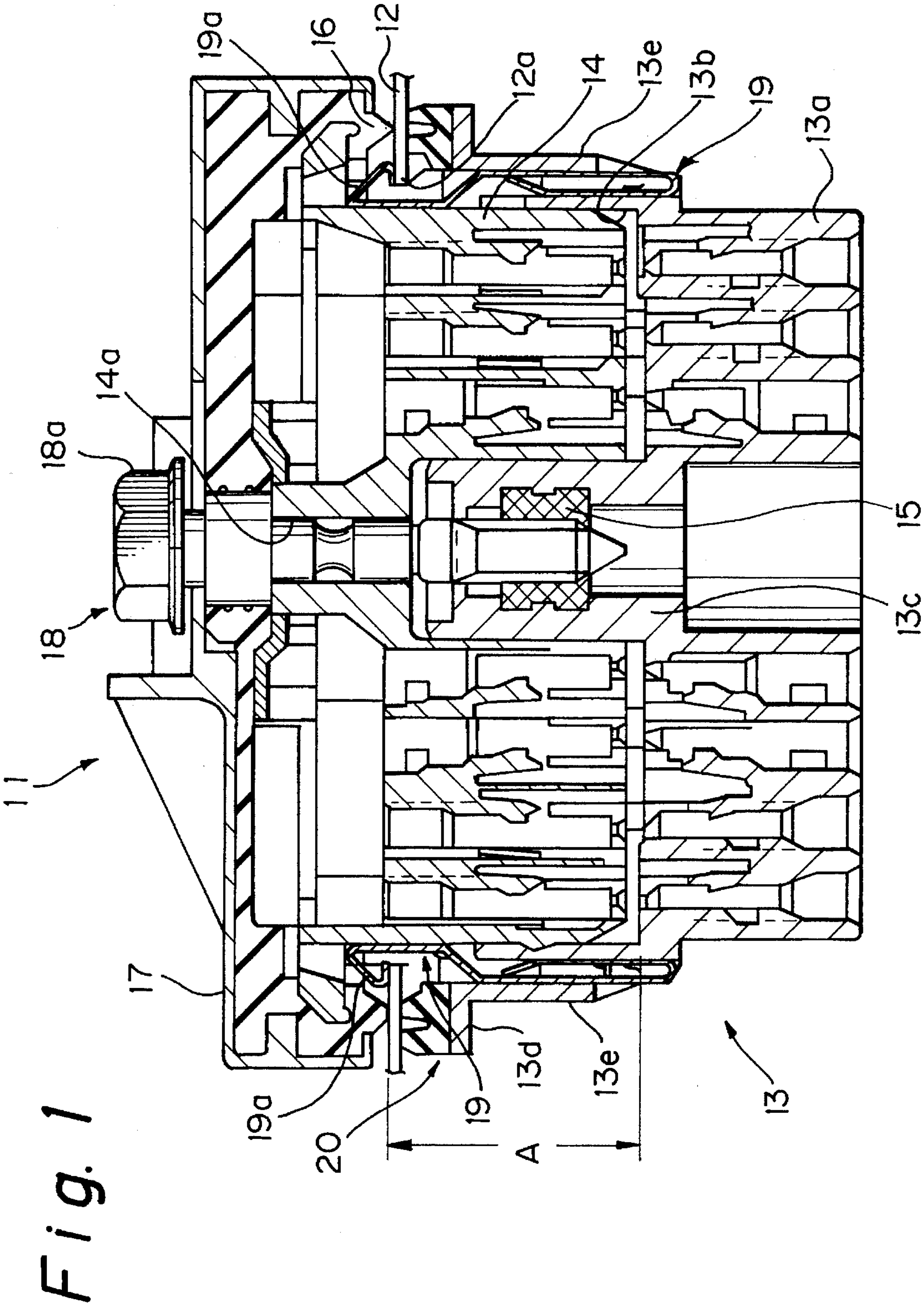
FIG. 1 is a longitudinal sectional view of an embodiment of a connector of the present invention, illustrating a state of the connector attached to a panel having a relatively small thickness.
Figure 2:
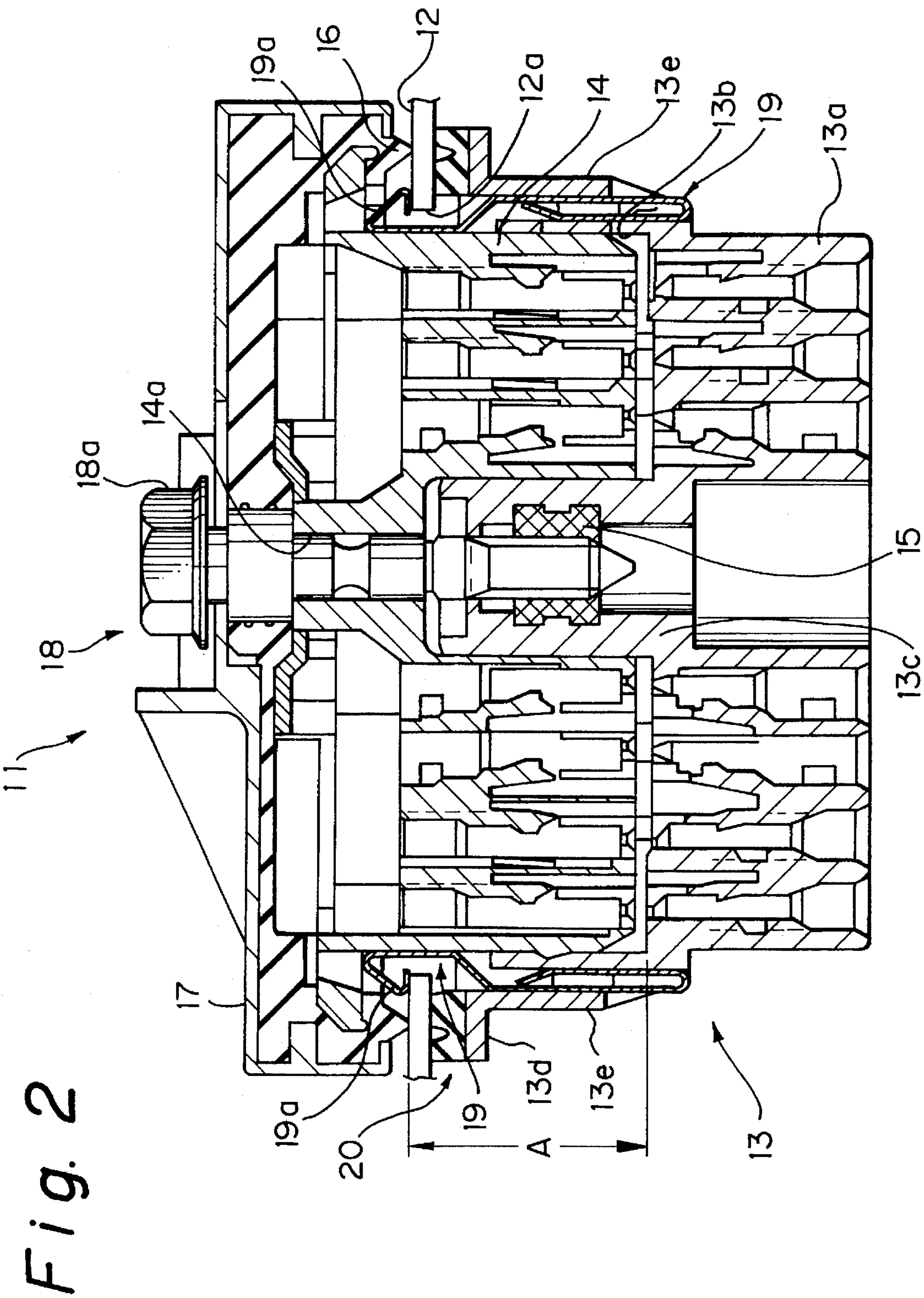
FIG. 2 is a longitudinal sectional view similar to FIG. 1, illustrating a state of the connector attached to a panel having a relatively large thickness.
Figure 3:
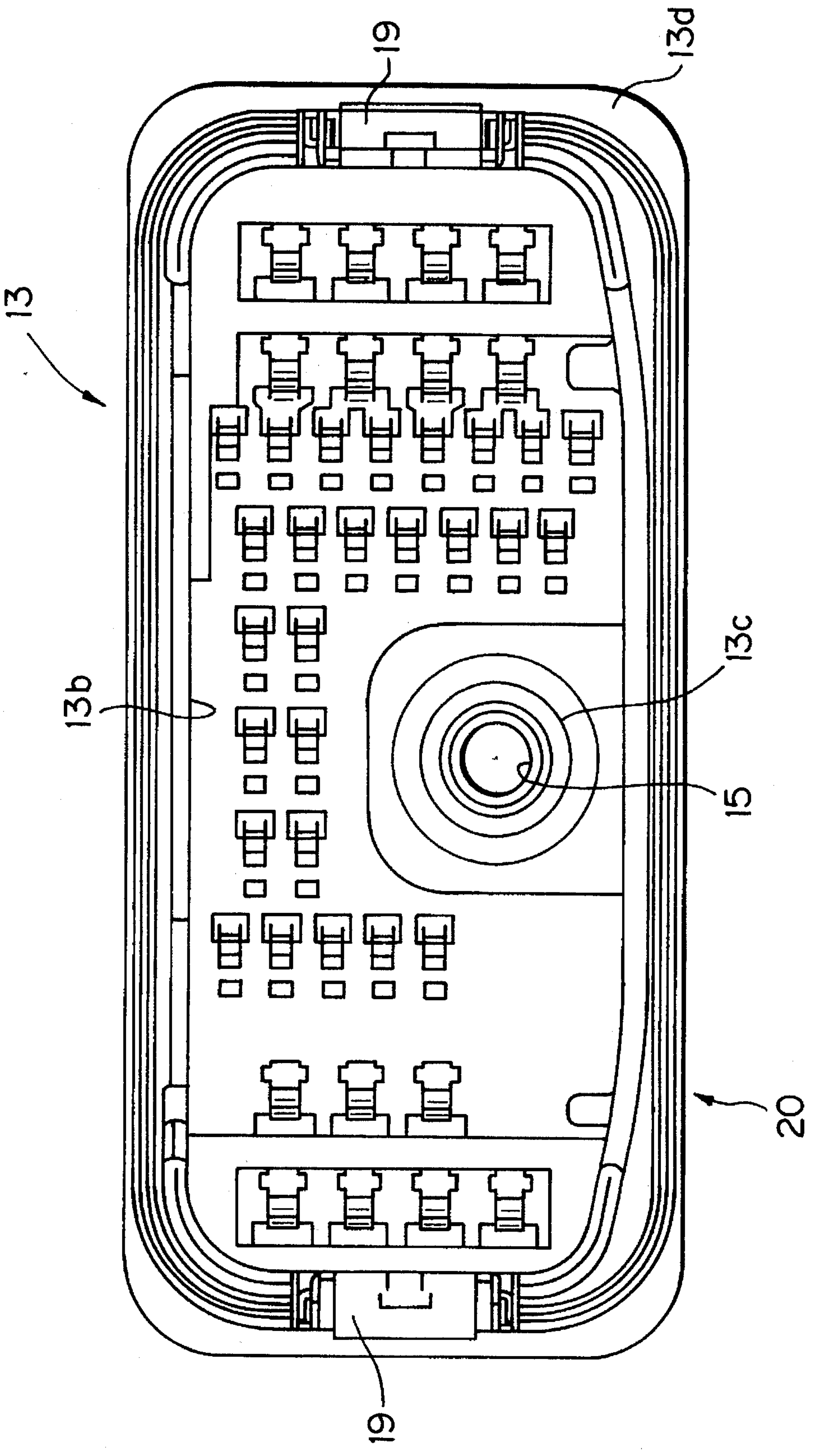
FIG. 3 is a plan view of a male connector housing.
Figure 4:
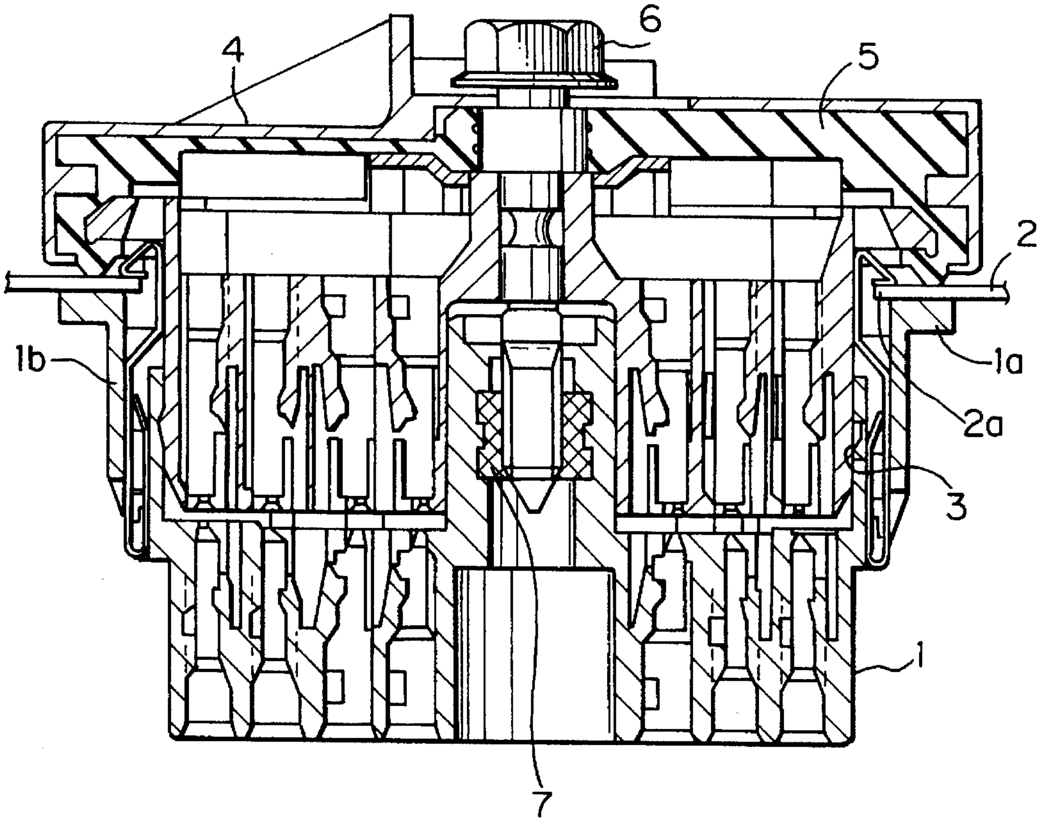
Fig. 4 PRIOR ART
FIG. 4 is a longitudinal sectional view of a conventional connector, illustrating a state of the connector attached to a panel having a relatively small thickness.
Figure 5:
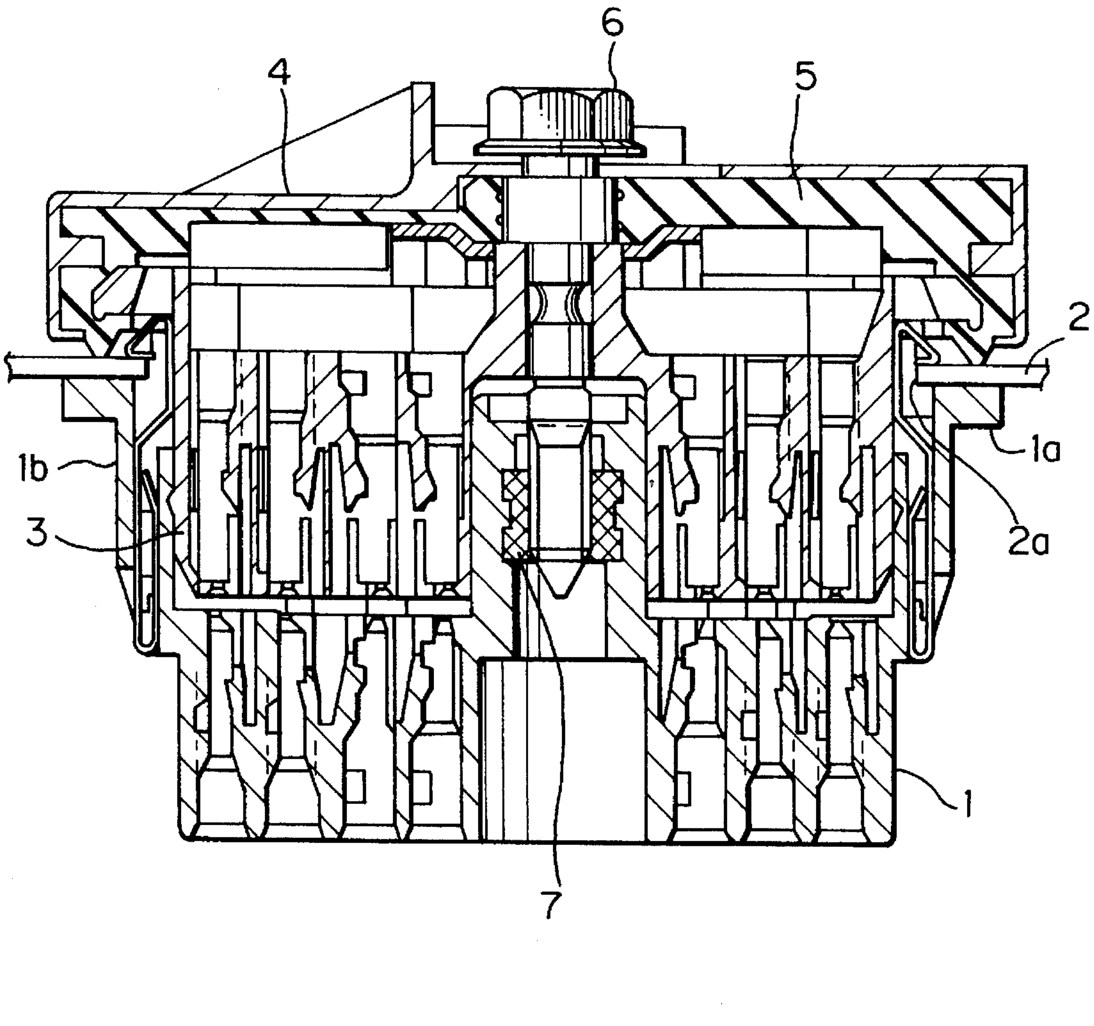
Fig. 5 PRIOR ART
FIG. 5 is a longitudinal sectional view of a conventional connector, illustrating a state of the connector attached to a panel having a relatively large thickness.

An embodiment in which a waterproofing assembly of the present invention is applied to a screw-fastening type connector will be explained below by referring to FIGS. 1 to 3. FIGS. 1 and 2 show a whole construction of a connector 11 of the present embodiment. The connector 11 includes a stationary or male connector housing 13 which is secured to a panel 12 and a detachable or female connector housing 14 which is detachably coupled to the male connector housing 13.

The male connector housing 13 has a base portion **13*a* and a box like hood 13*b* united to an upper part of the base portion and having an open upper part. Many male terminals supported by the base portion 13*a* are arranged in the male connector housing 13 (hood 13*b*). The male connector housing 13 is provided in its center with a boss 13*c* projecting from the base portion 13*a* upwardly. A nut 15 is disposed in the boss 13*c*** by, for example, an insert forming method.

The hood **13*b* of the male connector housing 13 is provided on its upper periphery with a flange 13*d*. As described hereinafter in more detail, the male connector housing 13 is attached to the rear side (lower side in the drawing) of the panel 12. A connecting end portion (upper end portion) of the housing 13 is opposed to the opening 12*a* in the panel 12. The flange 13*d* is opposed to the rear periphery around the opening 12*a* in the panel 12**.

On the other hand, the female connector housing 14 is formed into a rectangular block body which has round corners and is to be fitted to the hood **13*b* of the male connector housing 13. The housing 14 is provided in its interior with a number of female terminals not shown. A rubber seal member 16 is closely mounted on an upper periphery of the female connector housing 14 to seal a front side periphery around the opening 12*a* in the panel 12. Further, upper faces of the female connector housing 14** including the seal member 16 are enclosed by a rubber waterproofing cover 17.

A bolt-through hole **14*a* is formed in a central portion of the female connector housing 14. A bolt 18 is inserted into the hole 14*a* to engage with the nut 15. The bolt 18 projects its head 18*a* from the upper face of the housing 14** and can rotate and moves up and down in the drawing.

The female connector housing 14 is detachably fitted from the front side (upper side in the drawing) of the panel 12 through the opening **12*a* to the male connector housing 13. At this time, both connector housings 13 and 14 are moved toward each other by fastening the bolt 18 into the nut 15. When both connector housings 13 and 14** are coupled to each other, the male and female terminals are electrically interconnected.

In this embodiment, the male connector housing 13 is attached to the panel 12 by a securing fixture 19 made of a leaf spring material. The securing fixture 19 is attached to the hood **13*b* so that a lower portion of the fixture 19 is supported in an attaching portion 13*e* formed in the right and left sides of the hood 13*b*. The securing fixture 19 is provided on its upper part with an elastic contact piece 19*a*** which is formed by folding the upper end portion outwardly and downwardly.

The male connector housing 13 is fitted in the opening **12*a* in the panel 12 from its rear side so that the elastic piece 19*a* of the securing fixture 19 passes the panel 12. Thus, the contact piece 19*a* elastically presses the front side of the panel 12 so that the peripheral edges around the opening 12*a* in the panel 12 are clamped between the flange 13*d* and the contact piece 19*a*. This clamping force secures the male connector housing 13 to the panel 12. The female connector housing 14 is provided in its rear side with a recess to avoid any contact with the contact piece 19*a***.

A cushion member 20 is mounted on an upper face of the flange **13*d*. In this embodiment, the cushion member 20 is made of a rubber material being softer than the seal member 16. The flange 13*d* is opposed to the rear side of the panel 12 through the cushion member 20. The male connector housing 13 as well as the flange 13*d* are attached to the panel 12 to adjust a distance A from the front side of the panel 12 shown in FIG. 1 because of an elastic deformation of the cushion member 20**.

When the female connector housing 14 is coupled to the male connector housing 13 attached to the panel 12, the seal member 16 closely contacts with the front side of the panel 12. At this time, the cushion member 20 is compressed until both connector housings 13 and 14 are completely interconnected by the coupling force because the cushion member 20 is softer than the seal member 16. Thus, a positional relationship between both connector housings 13 and 14, that is, a distance between the lower ends of the flange **13*d* and seal member 16 becomes a given value. Consequently, the seal member 16 closely contacts with the front side peripheral edge around the opening 12*a* in the panel 12** with a given compression value, thereby obtaining an adequate waterproofing effect.

The panel 12 to support the connector 11 has various kinds of thickness. For example, the connector may be attached to the panel 12 having a relatively great thickness as shown in FIG. 2. However, even if the thickness of the panel 12 is increased as shown in FIGS. 1 and 2, the distance A between the front side of the panel 12 and the mating service of the male connector **13*d* (FIG. 2) is the same as that (FIG. 1) because the compressive deformation value of the cushion member 20 becomes larger than that in FIG. 1 so long as both connector housings are completely interconnected. Consequently, the compression value of the seal member 16 becomes constant, thereby obtaining a stable sealing function regardless of the thickness of the panel 12**.

Since the cushion member 20 is disposed between the flange 13*d* of the male connector housing 13 and the panel 12, the present embodiment differs from the conventional connector in which the flange 1*a* is directly attached to the panel 2. This will cause a creep and a poor contact of the seal member 5 upon an alternation of thickness of the panel 2. It is possible to set the attaching position of the male connector housing 13 with respect to the front side of the panel 12 to be constant. In other words, it is possible to dispose the front side of the panel 12 at the given position with respect to the male connector housing 13.

Accordingly, it is possible to set the compressive value of the waterproofing seal member 16 on the female connector housing 14 to be constant regardless of the thickness of the panel 12 upon coupling of both connector housings 13 and 14. Consequently, a stable sealing function can be obtained without causing the creep and poor constant of the seal member 16 and a stable coupling force can interconnect both connector housings 13 and 14.

Since the cushion member 20 is softer than the seal member 16 in this embodiment, adjustment of position of the male connector housing 13 can be automatically carried out by the coupling force exerted upon fitting of both connector housings 13 and 14. It is not necessary to adjust a position of the male connector housing 13 in compliance with the thickness of the panel 12. Further, since the male connector housing 13 is attached to the securing fixture 19 made of the leaf spring material in this embodiment, the housing 13 can be easily secured to the panel 12.

Although the cushion member 20 is softer than the seal member 16 in the above embodiment, the former may be harder than the latter. In this case, for example, the thickness of the cushion member 20 may be altered in compliance with the thickness of the panel 12 or adjustment of position may be effected upon attachment of the stationary connector housing. Also, although the male connector housing 13 is attached to the panel 12 by the securing fixture 19 made of the leaf spring material in the above embodiment, screw means or the like may be utilized for the fixture 19. The present invention can be applied to any kind of connector except the screw-fastening type connector.

What is claimed is:

1. A connector comprising:

a stationary connector housing adapted to be secured to a rear side of a panel having an opening so that a connecting end portion of said housing is opposed to said opening;

a detachable connector housing adapted to be removably attached to a front side of said panel and fitted through said opening in said panel to said stationary connector housing;

a waterproofing seal member provided on said detachable connector housing for closely contacting with a front side periphery around said opening in said panel upon fitting of said connector housings;

a flange provided on said stationary connector housing and adapted to be opposed to a rear side periphery around said opening in said panel; and a cushion member, softer than said seal member, disposed between said flange and said rear side periphery around said opening in said panel.

2. A connector according to claim 1, wherein said stationary connector housing has securing fixtures made of a leaf spring material, and wherein said panel is clamped between said securing fixtures and said flange to secure said stationary connector housing to said panel.

3. A connector according to claim 1, wherein said stationary connector housing has securing fixtures made of a leaf spring material, and wherein said panel is clamped between said securing fixtures and said flange to secure said stationary connector housing to said panel.

* * * * *